April 17, 1934.    G. WALTER    1,954,904
VIBRATING CENTRIFUGAL MOLD
Filed Dec. 13, 1932
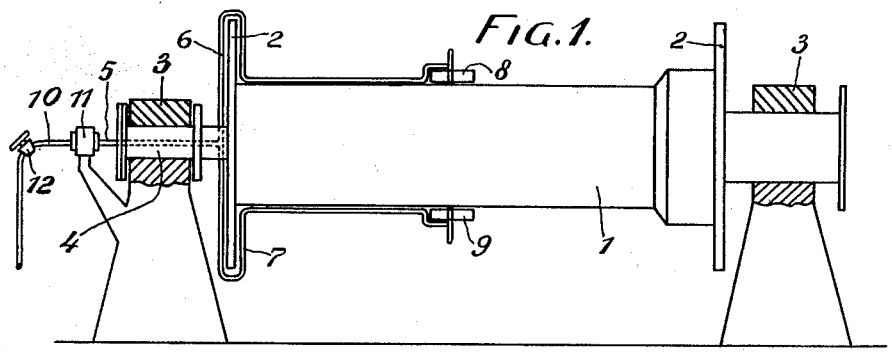
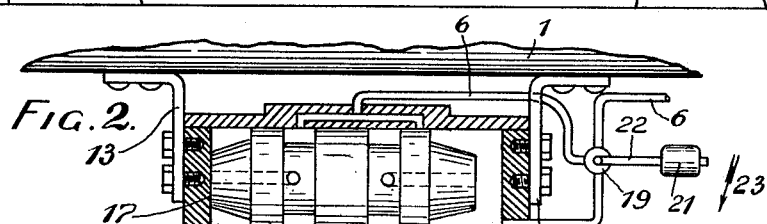
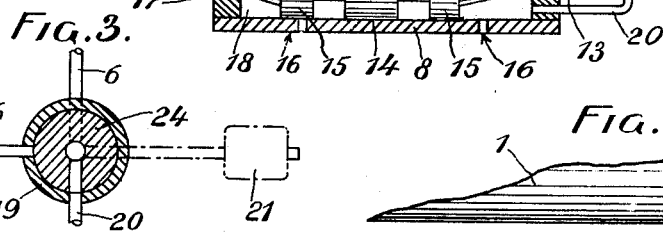
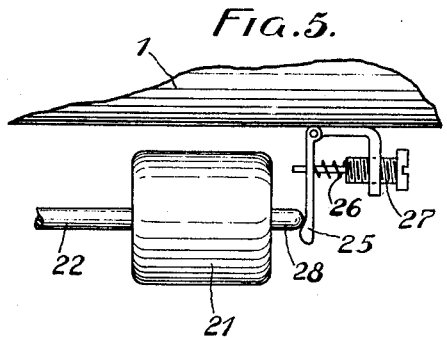
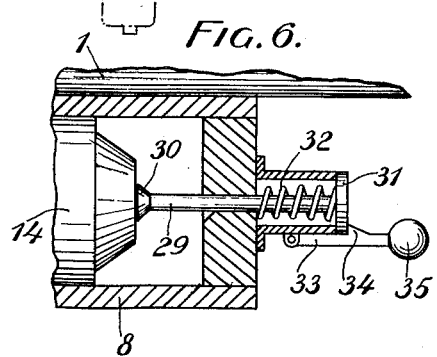
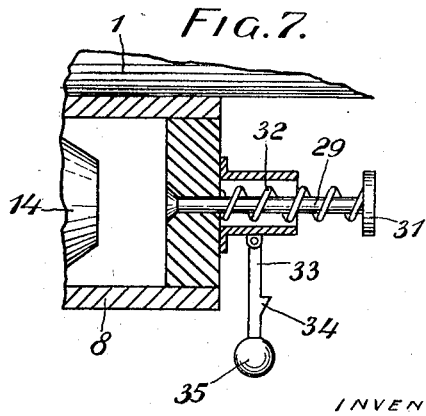
INVENTOR:
GEORGES WALTER
BY: Kruge & Boyce
ATTORNEYS Patented Apr. 17, 1934

1,954,904

UNITED STATES PATENT OFFICE 1,954,904

VIBRATING CENTRIFUGAL MOLD

Georges Walter, La Gordanne, Perroy, Switzerland, assignor to firm "Superbeton Société Anonyme," Zurich, Switzerland Application December 13, 1932, Serial No. 646,958
In Germany December 16, 1931

6 Claims. (Cl. 25—30)

The invention relates to a vibrating mold.

Such molds are used in particular for the manufacture of objects in concrete.

The object of the invention is a mold of this kind, especially intended for the manufacture of centrifugal objects, that is to say, a mold which vibrates whilst turning.

The invention consists in placing on the mold itself, the members intended to cause the vibration and this in such a way that these members turn with the mold.

Moreover, the invention consists in special means which allow the vibratory movement given to the mold to be set in motion at a given moment.

In the drawing, Fig. 1 is a view of the mold as a whole, with the members intended to cause it to vibrate; Fig. 2 is a sectional view on a larger scale of one of these members, in the form of a pneumatic hammer; Figs. 3 to 5 are detail views showing one method of automatically setting in motion the vibrators and Figs. 6 and 7 are detail views of another method of setting in motion the said vibrators.

The mold according to Fig. 1 is composed of a cylinder 1 placed upon two rotating supports 2, the mold as a whole together with its supports being rotatable in the bearings 3.

One of the shafts 4 in one of these bearings is hollow, in order to form a passage for a conduit 5 which divides into two conduits 6 and 7 connected to two vibratory devices 8 and 9 fixed on to the mold. An air or watertight connection is provided between the conduit 5 which turns with the mold and the fixed external conduit 10, this air or watertight connection being situated in a small auxiliary bearing 11.

The conduit 10 is provided with a cock 12 which regulates the supply of a compressed fluid, in particular, compressed air intended to actuate the vibratory devices 8 and 9.

It is therefore only necessary to open the cock 12, whilst the mold is turning, in order that the vibratory devices 8 and 9, which are nothing more than pneumatic hammers, shall start to function and communicate to the mold, whilst it is turning, a rapid, vibrating movement.

One of these pneumatic, vibratory devices, for example the device 8, is represented in section on a larger scale in Fig. 2, as also its fixation against the mold 1 by means of flanges 13. This device 8 comprises a cylinder in which is disposed a reciprocable piston 14 provided with grooves 15 for controlling the air which enters through the conduit 6, this air then escaping through the outlet ports 16. The piston is of truncated-cone formation at its opposite ends, whereby, when either end of the piston abuts against the end wall of the cylinder, a chamber 18 is formed around the end of the piston, and the piston is provided with channels 17 forming by-passes between the respective grooves 15 and said chambers 18. In the position in which it is represented, the piston 14 allows the air to pass from the conduit 6 through the left groove 15 and the channel 17 into the chamber 18 on the left of the cylinder, which results in the piston being displaced towards the right. In this position, a reverse action takes place which displaces the piston towards the left, the air in the cylinder escaping gradually through one or other of the outlet parts 16. The functioning of such a device being known, it is not necessary to describe same in greater detail.

One fact is however to be observed, that such pneumatic vibrators possess a dead centre, that is to say, cannot function of themselves when the piston is stopped in the middle of the length of the cylinder.

An object of the invention is to provide means whereby the piston may always be brought into a position in which it can function and a further object is to render possible the vibration of the device only when the mold has attained a certain desired speed of rotation.

For this purpose, the conduit 6 is provided with a several-way cock 19, one of the passages of which forms a continuation of the conduit 6 and serves to convey the air for actuating the device 8, whilst one of the other passages brings the conduit 6 into communication with the conduit 20 which introduces the air directly into one of the extremities of the cylinder, in such a way as to push the piston against the other extremity, away from its dead centre. This cock 19 is actuated by a weight 21 situated on a lever 22, this weight being placed, when the mold is set in motion, in the position according to Fig. 2, and then displaced in the direction of the arrow 23, when as a result of the rotation of the mold, the centrifugal force acts upon it.

Figs. 3 and 4 show a section of the cock 19 and in particular, what happens in this cock when the centrifugal device 21 is automatically set in motion. The air arriving through the conduit 6 into the centre of the plug 24 of the cock is conveyed into the conduit 20 when the weight 21 occupies the rest position represented by a dot and dash line in Fig. 3. Thus, the compressed air pushes the piston 14 towards one of the extremities of the cylinder, in the position represented in Fig. 2, in which it is not at its dead centre. When the mold turns at a certain speed and the weight 21 is displaced towards the outside into the position as shown by a dot and dash line in Fig. 4, the cock sends the air from the conduit 6 into its continuation 6, that is to say, establishes the working circuit of the vibratory device which automatically sets up the vibration of the mold.

A further object of the invention is to allow the regulation of the precise moment when the cock 19 sets the vibratory device in motion. This may be effected for example by means of a device such as that represented in Fig. 5. The weight 21 supported by the lever 22 is held by a member 25 subject to the action of a spring 26 the tension of which can be regulated by means of a screw 27. This member 25 in coming to bear against the extremity 28 of the lever 22 and due to the fact that it possesses a slight projection, holds back this lever 22 until the centrifugal force is great enough to release the said weight. The more the spring is tightened by means of the screw 27, the greater must be the centrifugal force in order to release the weight 21. This simple means allows the precise moment at which the vibratory device will be set in action to be regulated, that is to say, the speed at which the mold begins to vibrate.

A further method of preventing the vibrating device from remaining at dead centre and of releasing it at the moment when it must be set in motion, is represented in Figs. 6 and 7. These figures represent, on a larger scale, an extremity of the device 8 and of the piston 14 situated in the inside of the said device. The extremity of the device is pierced by a hole through which passes a rod 29 terminated at one of its extremities by an enlarged part 30 which engages the end of the piston 14, and at the other extremity by a disc 31 subject to the action of a spring 32 which tends to move the rod outside the cylinder 8.

An articulated lever 33 provided with a beak 34 and a weight 35, together constitute a lock device intended to maintain the rod 29 in the position as represented in Fig. 6, against the action of the spring 32. In this position, the rod 29 maintains the piston 14 at one of the extremities of the device, that is to say, away from its dead centre. When the mold turns at a certain speed, the centrifugal force acting upon the weight 35 causes the lever 33 to swing in such a way as to occupy the position represented in Fig. 7, in which the beak 34 releases the disc 31 and the rod 29 under the action of the spring 32, leaves its rest position against the piston 14 and comes into the position as shown in the said Fig. 7. In this position, the piston 14 is released and the vibratory device set in motion.

In both cases, that is in the whole as represented in Figs. 2 to 5 as also in Figs. 6 and 7, the device is brought back into its starting position after each complete operation.

In the first case, this is effected by turning the cock so as to bring the weight 21 into the position as shown in Figs. 2, 3 and 5.

In the second case, by bringing the weight 34 into the position as shown in Fig. 6, after having pushed the rod 29 into the vibratory device.

It is evident that certain changes and modifications may be made without however departing from the scope and spirit of the invention, such as defined in the claims.

What I claim is:

1. The combination with a rotatable mold, a cylinder secured to said mold for bodily rotation around the axis of the mold, a pneumatically actuated piston reciprocable in said cylinder for imparting vibratory motion to the mold, means for setting said piston in position for actuation and effective to retain it in said position while the mold is inactive, and centrifugally operative means effective on rotation of the mold to render said setting means inoperative.

2. The combination with a rotatable mold, of a cylinder secured to said mold for bodily rotation around the axis of the mold, said cylinder having a pair of inlet ports and a corresponding pair of outlet ports, a piston reciprocable in said cylinder and effective in two alternate positions to open and close the respective inlet ports and simultaneously close and open the corresponding outlet ports, a conduit in communication with said inlet ports for supplying a fluid effective to actuate said piston, means effective when the mold is inactive to retain the piston in one of said positions, and means actuated by the rotation of the mold for rendering said retaining means ineffective.

3. The combination with a rotatable mold, of a cylinder secured to said mold for bodily movement around the axis of the mold and having a pair of inlet ports communicating therewith at opposite sides of the transverse center line of the cylinder, a piston reciprocable in said cylinder and adapted alternately to close one of said ports and open the other, a conduit in communication with said ports for supplying a fluid under pressure to the cylinder through the alternately open ports thereby to cause reciprocation of the piston, said conduit having a branch in communication with the cylinder at one end thereof for supplying fluid under pressure thereby to impinge upon one end of the piston and cause it to move out of dead-center position, a control valve in said conduit adapted when in one position to prevent the passage of fluid to said ports and direct it through said branch conduit and in another position to close said branch conduit and direct the fluid toward said inlet ports, and centrifugally operative means connected to said valve and actuated by the rotation of the mold to move the valve from one position to the other.

4. The combination with a rotatable mold, of a cylinder secured to said mold for bodily movement around the axis of the mold and having a pair of inlet ports communicating therewith at opposite sides of the transverse center line of the cylinder, a piston reciprocable in said cylinder and adapted alternately to close one of said ports and open the other, a conduit in communication with said ports for supplying a fluid under pressure to the cylinder through the alternately open ports thereby to cause reciprocation of the piston, said conduit having a branch in communication with the cylinder at one end thereof for supplying fluid under pressure thereby to impinge upon one end of the piston and cause it to move out of dead-center position, a control valve in said conduit adapted when in one position to prevent the passage of fluid to said ports and direct it through said branch conduit and in another position to close said branch conduit and direct the fluid toward said inlet ports, a weighted lever secured to said valve and adapted to move it from one position to the other, tension means releasably engaging said lever for retaining the valve in the first position when the mold is inactive, and a weight carried by said lever and centrifugally operated during rotation of the mold thereby to swing said lever and move the valve to the second position.

5. The combination with a rotatable mold, of a cylinder secured to said mold for bodily rotation around the axis of the mold, said cylinder having a pair of inlet ports and a corresponding pair of outlet ports, a piston reciprocable in said cylinder and effective in two alternate positions to open and close the respective inlet ports and simultaneously close and open the corresponding outlet ports, a conduit in communication with said inlet ports for supplying a fluid effective to actuate said piston, a rod effective to engage said piston and move it to one of said positions, means for locking the rod thereby to retain the piston in said position when the mold is inactive, and centrifugally actuated means effective when the mold is rotated to release said rod thereby to permit reciprocation of the piston.

6. The combination with a rotatable mold, of a cylinder secured to said mold for bodily rotation around the axis of the mold, said cylinder having a pair of inlet ports and a corresponding pair of outlet ports, a piston reciprocable in said cylinder and effective in two alternate positions to open and close the respective inlet ports and simultaneously close and open the corresponding outlet ports, a conduit in communication with said inlet ports for supplying a fluid effective to actuate said piston, a rod slidable in said cylinder and effective to engage the piston and move it to one of said positions, said rod having a flanged head at its outer end, a spring in engagement with said head thereby to move the rod outward, a pivoted lever having a latch adapted to engage said head thereby to hold the rod in piston engaging position against the tension of said spring, and a weight carried by said lever and centrifugally operable when the mold is rotated to swing the lever on its pivot thereby to move said latch out of engagement with said head and permit the rod to be moved under tension of said spring out of piston engaging position.

GEORGES WALTER.